March 28, 1933.　　　　F. C. PALIN　　　　1,903,264
HOE, MULCHER, AND WEED DESTROYER
Filed April 27, 1931　　2 Sheets-Sheet 1
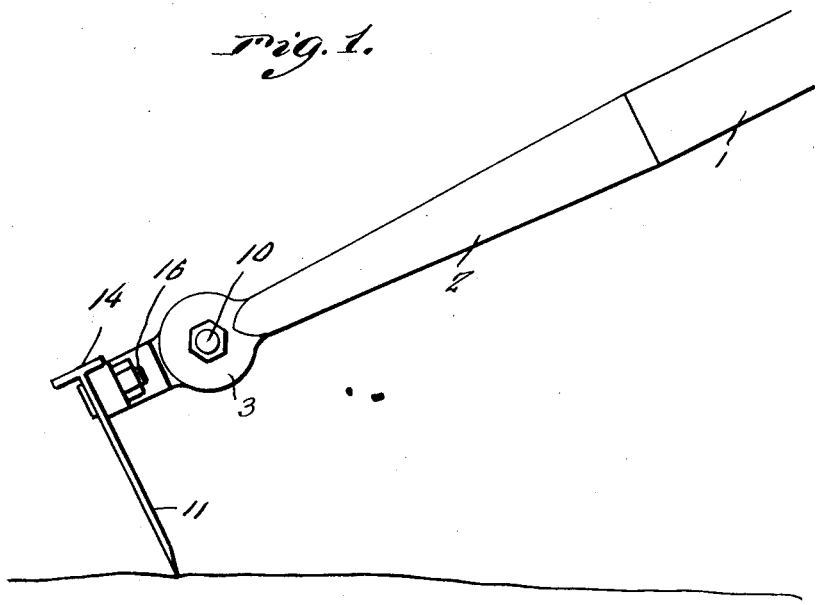
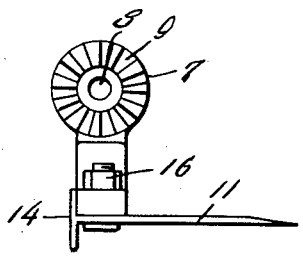
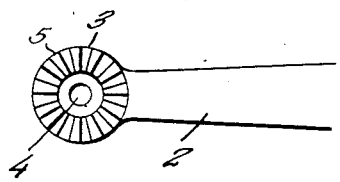
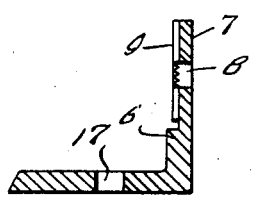
Inventor
Fred C. Palin
By Clarence A. O'Brien
Attorney March 28, 1933.  F. C. PALIN  1,903,264
HOE, MULCHER, AND WEED DESTROYER
Filed April 27, 1931  2 Sheets-Sheet 2
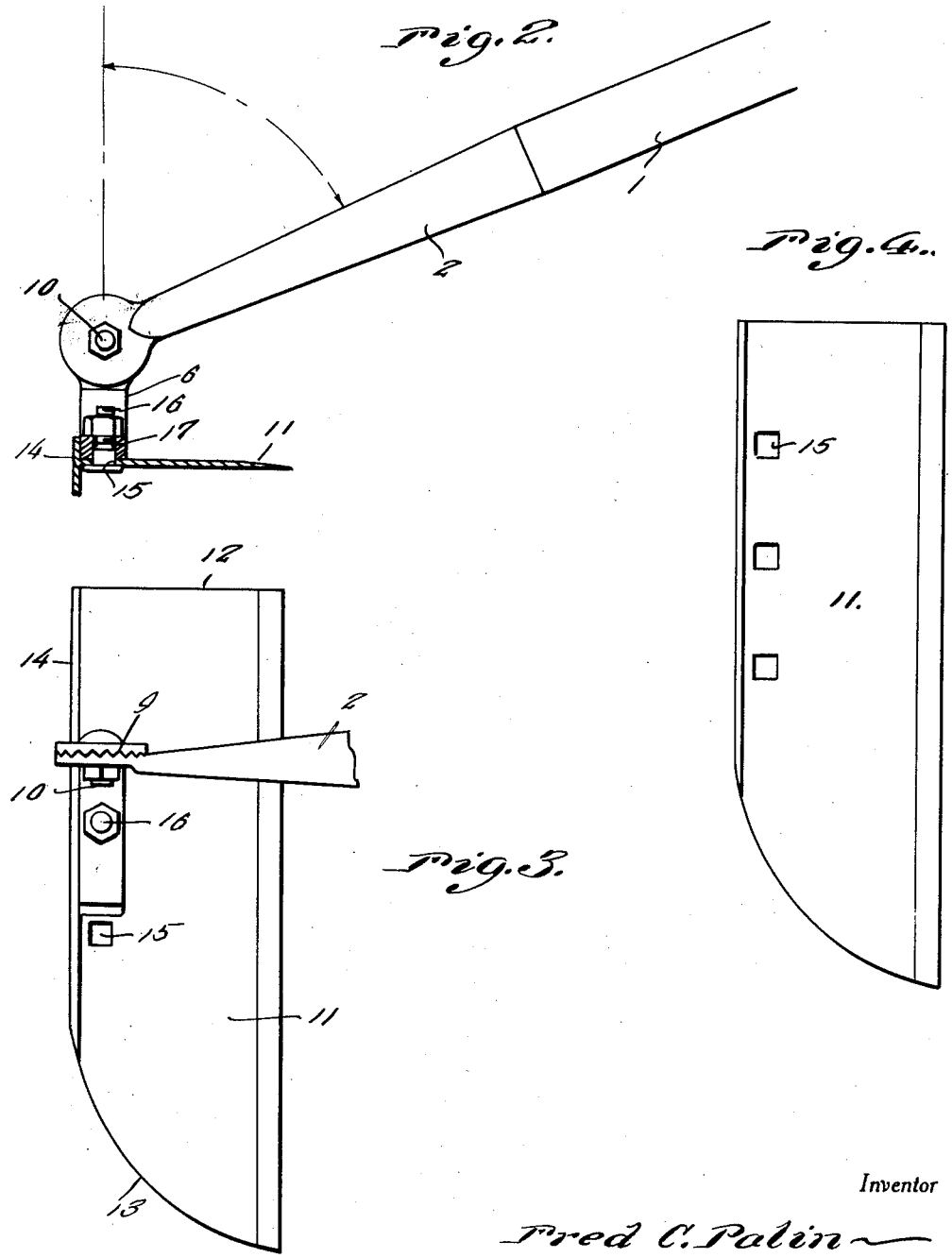
Inventor
Fred C. Palin
By Clarence A. O'Brien
Attorney Patented Mar. 28, 1933

1,903,264

UNITED STATES PATENT OFFICE

FRED C. PALIN, OF NEWTON, INDIANA

HOE, MULCHER, AND WEED DESTROYER

Application filed April 27, 1931. Serial No. 533,291.

This invention relates to an agricultural implement made in the form of a hoe and which can be used for mulching and destroying weeds and the like, the general object of the invention being to provide means for making the parts adjustable so that the device can be used by either a left hand or a right hand person with the blade in various positions to suit the work which is to be done with the implement, and to adjust the handle to permit the device to be used by persons of different heights.

This invention also consists in certain other features of construction and in the combination and arrangement of the several parts, to be hereinafter fully described and illustrated in the accompanying drawings, and specifically pointed out in the appended claim.

In describing the invention in detail, reference will be had to the accompanying drawings wherein like characters denote like or corresponding parts throughout the several views, and in which:—

Figure 1 is an elevation of the invention showing the blade in one position.

Fig. 2 is an elevation partly in section, showing the parts in another position.

Fig. 3 is a top plan view of Fig. 2.

Fig. 4 is a plan view of the blade.

Fig. 5 is a view of the blade and angle-shaped shank detached from the handle.

Fig. 6 is a view of the socket shank which is attached to the handle.

Fig. 7 is a sectional view through the angle-shaped shank.

In these views, the numeral 1 indicates the handle of the implement, and the numeral 2 indicates a socket type shank for receiving an end of the handle, and this shank 2 is formed with a circular end part 3 having a centrally arranged hole 4 therein, and corrugations 5 on one face thereof. The numeral 6 indicates an angle-shaped shank which at one end has a circular part 7 formed with a hole 8 and the corrugations 9 so that this circular part can be connected to the shank 2 by the bolt 10, which passes through the holes 4 and 8, and by tightening the nut on this bolt, the corrugations 5 and 9 will engage each other and thus firmly hold the parts in adjusted position. By loosening the nuts, the shank 6 can be moved to place the shank 6 in various positions and also to adjust the angle of the handle 1 to suit persons of different heights as shown by the arrows.

The blade is shown at 11 and said blade has one square end as shown at 12, and a rounded end as shown at 13, with its rear edge flat and formed with a flange 14 on each face thereof, and this rear part of the blade is formed with a plurality of square holes 15 for receiving a square part of a bolt 16 which also passes through a hole 17 in the angularly disposed arm or free limb of the shank 6 so as to detachably and adjustably connect the blade with said shank. The said arm or free limb of the shank 6 is arranged longitudinally at the inner side of and against one flange 14 of the blade 11 so as to take off strain from the connection between the said arm or free limb of the shank and the blade.

By providing the two flanges 14 the blade can be reversed to place another side of the blade lowermost. By providing a plurality of holes 15 in the blade, Figure 3, the blade can be adjusted longitudinally with respect to the shank 6.

As before stated, this device can be used as a hoe with either the long beveled edge in use, or with either of the ends 12 and 13 in use, and it can be used for cutting weeds or the like either in the position shown in dotted lines in Fig. 1, or in full lines in Fig. 2, and the parts can be adjusted to any other desired position, as is required.

It is thought from the foregoing description that the advantages and novel features of the invention will be readily apparent.

It is to be understood that changes may be made in the construction and in the combination and arrangement of the several parts, provided that such changes fall within the scope of the appended claim.

Having thus described my invention, what I claim as new is:—

An agricultural implement comprising a blade having a major portion and also having at the back edge of the major portion a straight flange disposed at right angles to the plane of the major portion, a handle, a right angle shank having a portion joined to the handle in fixed relation and also having an arm or free limb extending at right angles to said portion and disposed against one side of the major portion of the blade and also disposed at the inner side of and against the blade flange, the major portion of the blade being provided with a series of apertures adjacent to the flange and the said arm or free limb of the shank being provided with an aperture at an intermediate point in the length of the arm or free limb and adapted to be registered with any one of the apertures of the blade, a headed bolt constituting the sole connection between said shank and blade, said bolt being disposed in the registered apertures of the blade portion and the arm or free limb of the shank, and a nut threaded on said bolt and arranged against the arm or free limb of the shank.

In testimony whereof I affix my signature.

FRED C. PALIN.